(12) United States Patent
Chen et al.

(10) Patent No.: US 9,445,241 B2
(45) Date of Patent: Sep. 13, 2016

(54) LOCATION TRACKING FOR MOBILE DEVICE USING WI-FI ACCESS POINT CLUSTER

(71) Applicant: Verizon Patent and Licensing Inc., Arlington, VA (US)

(72) Inventors: Ming Chen, Bedford, MA (US); Dahai Ren, Lincoln, MA (US); Lei Zhang, Frisco, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 20 days.

(21) Appl. No.: 14/334,081

(22) Filed: Jul. 17, 2014

(65) Prior Publication Data

US 2016/0018507 A1    Jan. 21, 2016

(51) Int. Cl.
   *H04W 24/00*    (2009.01)
   *H04W 4/04*    (2009.01)
   *G01S 5/02*    (2010.01)

(52) U.S. Cl.
   CPC ............ *H04W 4/043* (2013.01); *G01S 5/0252* (2013.01)

(58) Field of Classification Search
   None
   See application file for complete search history.

(56) References Cited

U.S. PATENT DOCUMENTS

2010/0311436 A1* 12/2010 Bevan ................. G01S 5/0252
                                                          455/456.1
2012/0184301 A1*  7/2012 Jovicic ................ G01S 5/0081
                                                          455/456.5

* cited by examiner

Primary Examiner — Martin Mushambo

(57) ABSTRACT

A method includes determining a radio frequency (RF) fingerprint mapping to an indoor floor plan for an indoor area. The method includes clustering Wi-Fi access point devices deployed in the indoor area into groups of Wi-Fi access point devices based on RF fingerprint data received by at least one reference point device. The method includes selecting a Wi-Fi access point device from each group of Wi-Fi access point devices and determining a RF fingerprint based on the selected Wi-Fi access point devices. The method includes receiving a request for a location associated with a mobile device. The request includes a sampled RF fingerprint associated with the mobile device. The method also includes comparing the RF fingerprints based on the selected Wi-Fi access point devices with the sampled RF fingerprint associated with the mobile device to determine a location of the mobile device within the indoor area.

20 Claims, 8 Drawing Sheets

LOCATION TRACKING FOR MOBILE DEVICE USING WI-FI ACCESS POINT CLUSTER

BACKGROUND

Triangulation and radio frequency (RF) fingerprinting are two major Wi-Fi location tracking technologies. Triangulation uses multiple access points to find a device based on the received signal strength of the device at each access point. Triangulation based location tracking systems determine the intersection point of a device's signal at each access point to identify the device's most likely location. RF fingerprinting based location tracking systems create a grid mapped to a floor plan that includes all physical characteristics and access points in a given area. The RF fingerprinting based location tracking is theoretically more accurate than triangulation based location tracking.

However, RF fingerprinting based location tracking systems are required to maintain a database to store the mapping relationship between RF fingerprints and locations. The RF fingerprinting system's location accuracy is highly dependent on the accuracy of the database, including both the resolution of the samples in the database and the truthfulness (or accuracy) of the values in the database. The construction and the maintenance of the RF fingerprinting database require significant investment of time and manpower. Additionally, based on movement of the devices at the access points or other factors, the entire indoor area may occasionally need to be scanned (or rescanned) to ensure the accuracy of the RF fingerprinting database. Thus, although RF fingerprinting is technically more comprehensive than triangulation, triangulation dominates today's indoor location tracking market.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide an indoor location tracking system based on Wi-Fi fingerprint clustering and reference points (or active reference points). The system may determine a location of a mobile device within an indoor area based on Wi-Fi (or RF) fingerprinting. The accuracy of the Wi-Fi fingerprinting may be determined based on reference points. Active reference points are fixed devices (with respect to a position in the indoor area, e.g., fixed to a particular wall) that receive a Wi-Fi fingerprint based on wireless networks associated with Wi-Fi (i.e., wireless) access devices and continuously provide reference information regarding Wi-Fi networks detected in the surrounding area. The system may use information from active reference points to improve the accuracy and reduce implementation effort (e.g., reduce or eliminate the necessity of scanning the indoor area when devices are moved or other changes would necessitate rescanning for Wi-Fi fingerprints). The active reference points may consistently detect and record the Wi-Fi fingerprints and forward the real-time Wi-Fi fingerprints to an indoor location tracking (backend) server.

Consistent with embodiments, the system may utilize Wi-Fi fingerprint clustering to reduce noise and improve accuracy. The systems may determine a cluster of Wi-Fi access point devices that provide similar information and select from among each cluster based on signal strength or other measure of the clarity of the Wi-Fi fingerprinting. Real-time Wi-Fi fingerprinting data may be recorded based on the selected Wi-Fi access point devices and the database may be updated based on the real-time data. Because the detected Wi-Fi fingerprints are real-time, any changes to the Wi-Fi fingerprint mapping based on the positioning of the Wi-Fi access points in the indoor area may be handled in a short period of time (e.g., without further human interaction or instructions). This may reduce the implementation effort and the necessity for additional manpower (for rescanning the indoor area).

Figure 1:
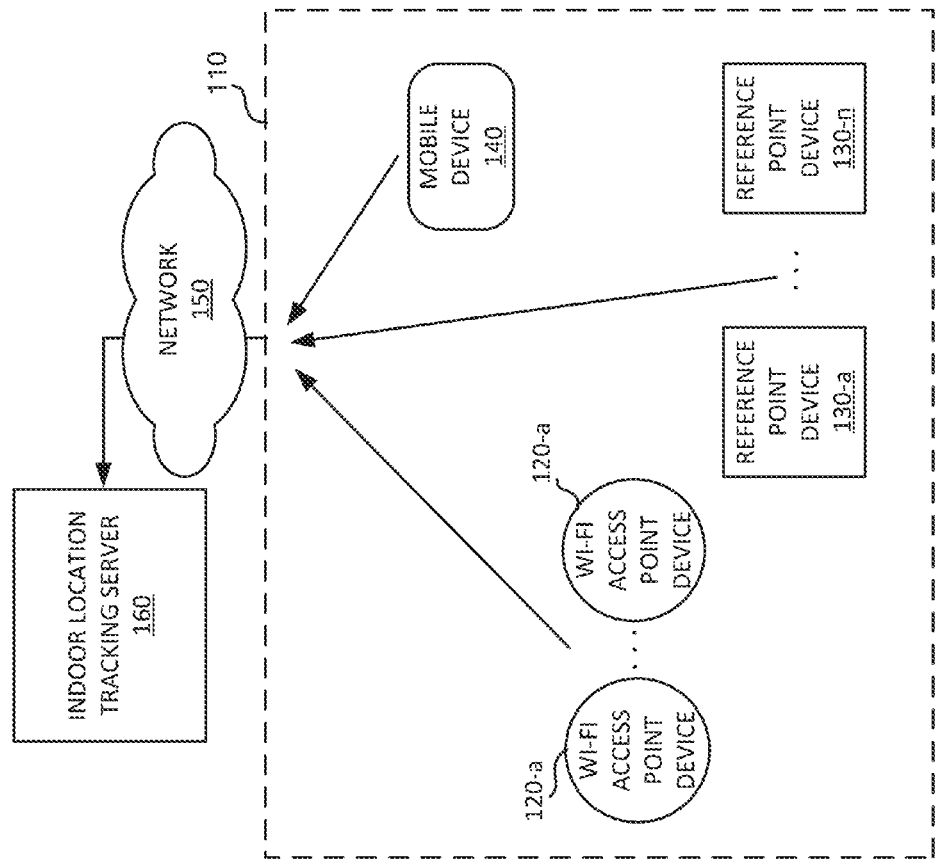
FIG. 1 illustrates an exemplary system for determining the location of a mobile device in an indoor area.

FIG. 1 is a block diagram of an exemplary environment 100 in which systems and methods described herein may be implemented. As shown, environment 100 may include an indoor area 110, a network 150, and an indoor location tracking server 160. Indoor area 110 may include Wi-Fi access point devices 120-*a* to 120-*n* (collectively referred to as Wi-Fi access point devices 120 or individually as Wi-Fi access point device 120), reference point devices 130-*a* to 130-*n* (collectively referred to as reference point devices 130 or individually as reference point device 130), and mobile device 140 (referred to in singular as mobile device 140 or in plural as mobile devices 140). These components/devices are described below in greater detail with references to FIGS. 2-8.

Indoor area 110 may include a physical area, such as a room or group of rooms or a particular area in a building, or any portion of an indoor building, etc. Indoor area 110 may include an area in which an indoor location tracking system may be implemented based on fingerprinting of Wi-Fi access point devices 120. Indoor location tracking system may determine the location of mobile device 140 based on pure pattern matching of Wi-Fi fingerprints (as opposed to triangulation) detected by mobile devices 140 with a Wi-Fi fingerprint database that is mapped to positions in the indoor location 110. The indoor location tracking system may include Wi-Fi access point devices 120 and reference point devices 130. The indoor location tracking system may locate mobile devices 140 to a degree of accuracy of one meter or less.

Each Wi-Fi access point device 120 may include a device that broadcasts and provides access to a wireless network. Wi-Fi access point device 120 may produce a wireless network that includes unique information associated with the network, such as a media access control (MAC) address. The wireless network may also include Wi-Fi connection information such as a service set identifier (SSID), an authentication code and a uniform resource locator (URL) for nearby devices to access the wireless network. The distinct fingerprint of the wireless network may be used to determine a position of the Wi-Fi access point device 120 and of other devices relative to the Wi-Fi access point device 120.

Figure 7:
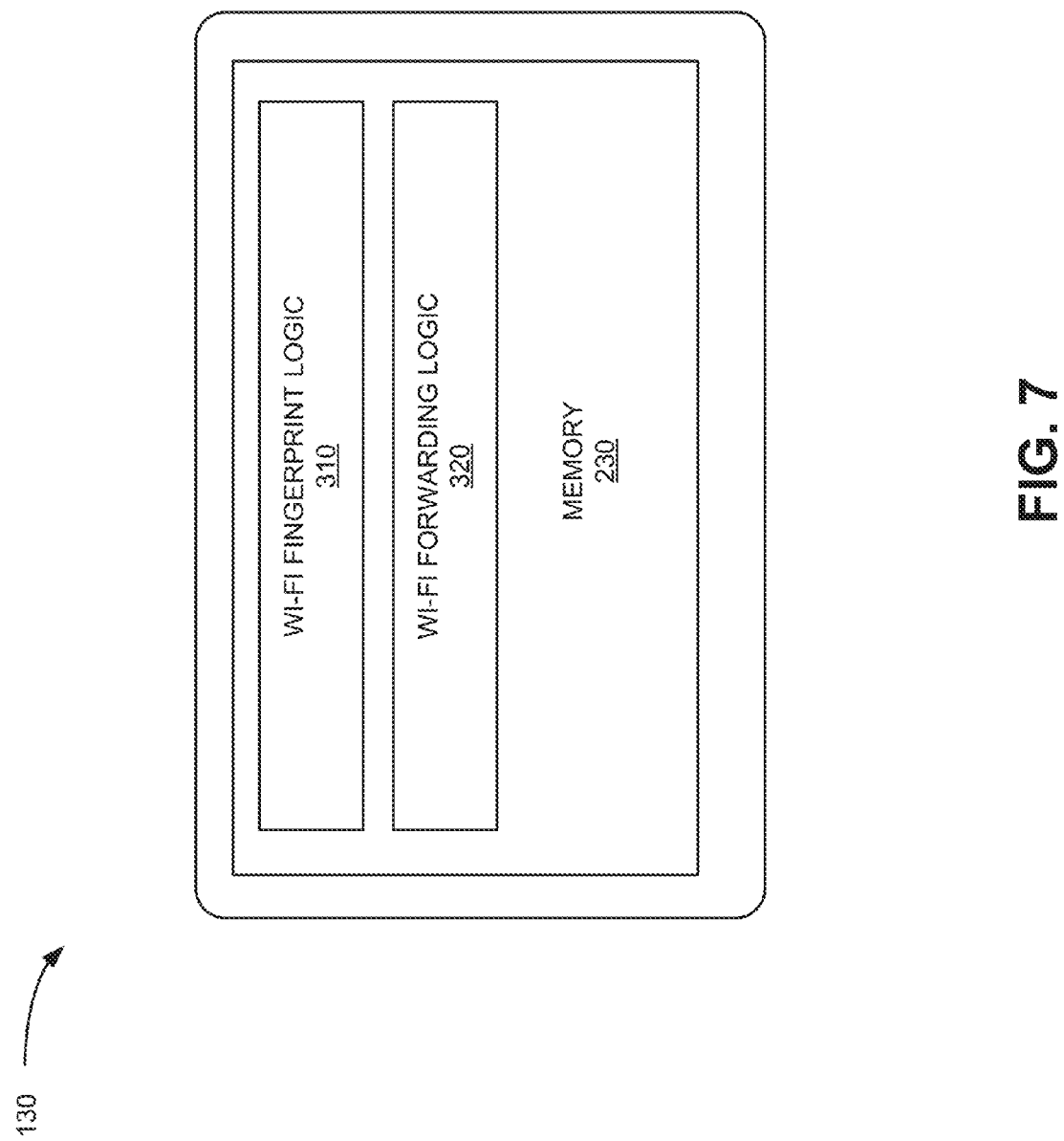
FIG. 7 illustrates an exemplary reference point device.

Each reference point device 130 may include a fixed position device capable of communicating via a network, such as network 150, information regarding Wi-Fi fingerprints generated based on wireless access point devices 120, such as described below with respect to FIG. 7. Reference point device 130 may actively transmit Wi-Fi fingerprint information to indoor location tracking server 160. Reference point device 130 may transmit information including an identity of the Wi-Fi access point device 120, a received signal strength indicator (RSSI), etc. Reference point device 130 may increase the accuracy of Wi-Fi fingerprint data in conjunction with indoor location tracking server 160 by applying techniques such as clustering to select a combination of Wi-Fi access point devices 120 that provide the clearest, most accurate information Wi-Fi fingerprint data. Indoor location tracking system may use active reference points 130 to increase the accuracy.

Each mobile device 140 may include any device capable of communicating via a network, such as network 150. Mobile device 140 may include an interactive client interface, such as a graphic user interface (GUI). Examples of mobile device 140 may include a mobile phone, a tablet, a personal computer, or another device that may receive wireless device access. Mobile device 140 may include a wireless fingerprint sampling client that allows the user to sample a wireless fingerprint received at mobile device 140 and send the wireless fingerprint information to indoor location tracking server 160, such as described herein below with respect to FIG. 5.

Network 150 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, network 150 may include a number of networks that provide services to indoor area 110. In one implementation, network 150 may be connected to indoor area 110 via an optical communication link, such as an optical fiber provided to indoor area 110. In another implementation, network 150 may be connected to indoor area 110 (and wireless access pointe devices 120) via a coaxial cable. In still another implementation, network 150 may be connected to indoor area 110 via a wireless (e.g., satellite, long term evolution (LTE), etc.) connection.

Indoor location tracking server 160 may track the location of mobile device 140 within indoor area 110, such as described herein below with respect to FIG. 3. Indoor location tracking server 160 may match the Wi-Fi fingerprint to a position in the floor plan and determine the position of the mobile device 140 based on the matched position in the floor plan. Indoor location tracking server 160 may determine the position of the matched floor plan and the current sampled fingerprint of the mobile device 140 based on real time data (i.e., the information provided to indoor location tracking server 160 may define an ongoing Wi-Fi fingerprint). Indoor location tracking system may apply a clustering technique to select Wi-Fi access point devices 120 to include in the determination of each Wi-Fi fingerprint that is mapped to the indoor area 110. Indoor location tracking system may continuously (or at predetermined intervals) perform an ongoing selection of a cluster and determination of Wi-Fi fingerprint accuracy based on the real time data (i.e., current location based on current data). In contrast, current embodiments of RF fingerprint systems may typically perform just a one-time scan Depending on the implementation, system 100 may include additional, fewer, or different components than those illustrated in FIG. 1. For example, in one implementation, system 100 may include additional Wi-Fi access point devices 120, reference point devices 130, mobile devices 140, indoor location tracking servers 160, etc. Furthermore, although not illustrated in FIG. 1, in an actual implementation, environment 100 may include different network components, such as switches, bridges, routers, gateways, firewalls, different types of client/server devices, etc.

Figure 2:
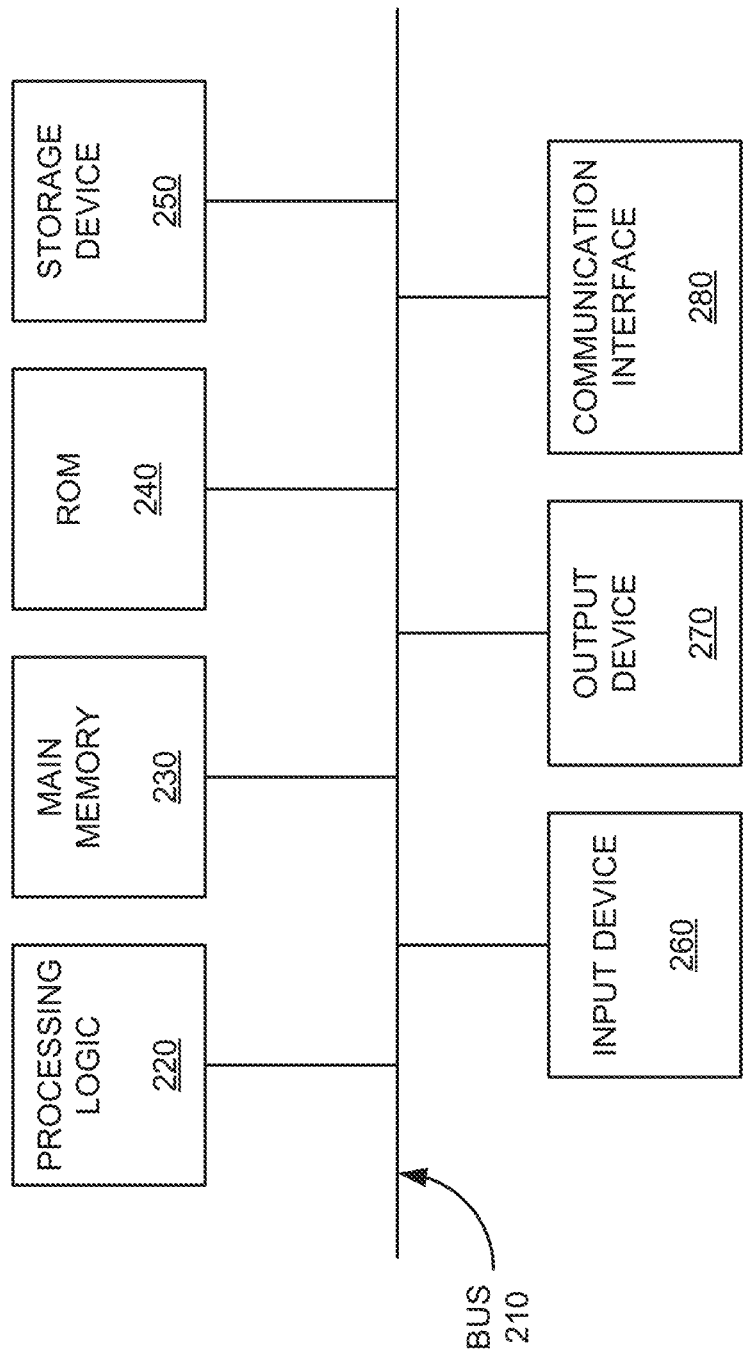
FIG. 2 illustrates exemplary components of one or more devices depicted in FIG. 1.

FIG. 2 is an exemplary diagram of a device 200 that may correspond to any of Wi-Fi access point devices 120, reference point devices 130, mobile devices 140 and/or indoor location tracking servers 160. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing machine-readable instructions (i.e., software instructions) contained in a computer-readable medium, such as main memory 230. A computer-readable medium may be defined as a physical or logical memory device. The machine-readable instructions may be read into main memory 230 from another computer-readable medium, such as storage device 250, or from another device via communication interface 280. The machine-readable instructions contained in main memory 230 may cause processing logic 220 to perform processes described herein. Alternatively, hard-wired circuitry may be used in place of or in combination with machine-readable instructions to implement processes described herein. Thus, implementations described herein are not limited to any specific combination of hardware devices, circuitry, and/or machine-readable instructions.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
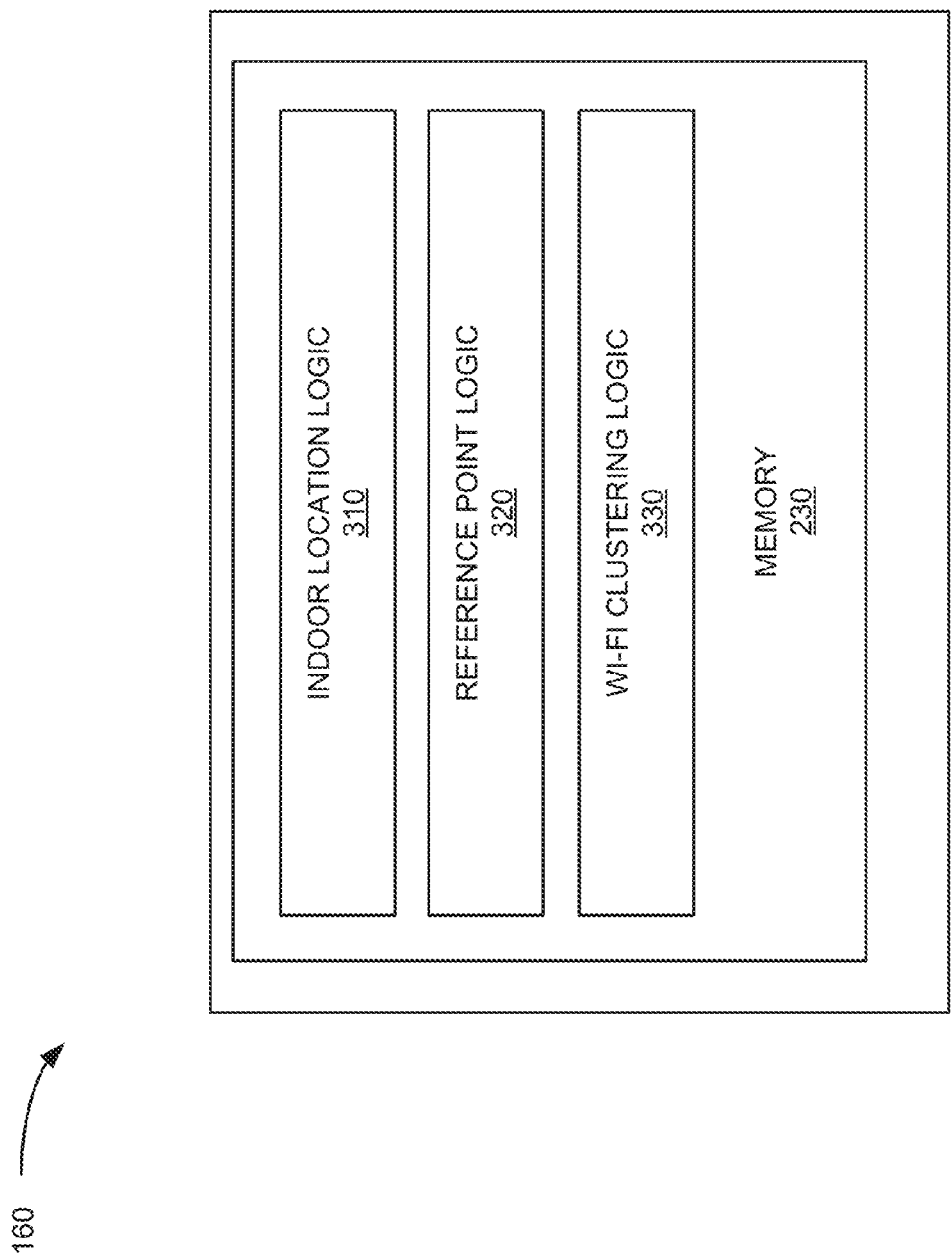
FIG. 3 is an exemplary functional block diagram of components implemented in the indoor location tracking server of FIG. 1.

FIG. 3 is an exemplary functional block diagram of components implemented in indoor location tracking server 160. In an exemplary implementation, all or some of the components illustrated in FIG. 3 may be stored in memory 230. For example, referring to FIG. 3, memory 230 may include indoor location tracking logic 310, reference point logic 320 and Wi-Fi clustering logic 330. In addition, various logic components illustrated in FIG. 3 may be implemented by processing logic 220 executing one or more programs stored in memory 230.

Indoor location tracking logic 310 may track a location associated with a mobile device based on Wi-Fi fingerprint matching of a Wi-Fi signal sampled and provided by the mobile device 140 with a point in a Wi-Fi fingerprint grid associated with indoor area 110. Indoor location tracking logic 310 may perform a scan (in real time) to determine the Wi-Fi fingerprint pattern for each point in the grid associated with the local area 110.

The real-time data may be used to improve the accuracy of determining the location of the mobile device 140 by updating the Wi-Fi fingerprint database, which stores the relationship between physical location and Wi-Fi fingerprints. Indoor location tracking logic 310 may match a grid of RF or Wi-Fi fingerprints to a floor plan and in some instances provide a three dimensional grid that may be used to track movement of the mobile devices 140 both horizontally and vertically within indoor area 110. Indoor location tracking logic 310 may automatically rescan the floor if any of the Wi-Fi access point devices 120 are moved (e.g., if indoor location tracking logic 310 detects a deviation in the position of any of Wi-Fi access point devices 120.

In contrast to traditional RF fingerprint location tracking system in which the database is generated by initial scanning and thus cannot be updated until the next round of scanning, the indoor location tracking logic 310 may continuously update the Wi-Fi fingerprint database or update based on deviations detected in portions of the grid. Indoor location tracking logic 310 may thus adapt to new situations (changes in position of any of Wi-Fi access point devices 120, additional or fewer Wi-Fi access point devices 120, etc.) without performing a new scan of the whole floor and thereby avoid the use of manpower and time to scan indoor area 110. Indoor location tracking logic 310 may determine the Wi-Fi fingerprint grid based on information provided by reference point devices 130 and avoid having to put Wi-Fi devices at each point of the grid to create a mapping.

Reference point logic 320 may manage information associated with reference point devices 130 including a fixed (or long term) position of the reference point devices 130. Reference point devices 130 may be fixed to a position in the floor plan. Reference point logic 320 may determine the position of each active reference point device 130 that may be used for calibration purposes. Reference point logic 320 may allow the Wi-Fi fingerprint mapping to be recalibrated to recreate the database (or portions of the database) if Wi-Fi access point devices 120 are moved. Reference point devices 130 may provide the most recent real-time Wi-Fi fingerprint data and thus allow reference point logic 320 to automatically update the database. Reference point logic 320 may analyze the Wi-Fi fingerprints based on fixed reference points (i.e., fixed locations associated with the reference point devices 130) and allow free movement of the Wi-Fi access point devices 120 as reference point logic 320 may readily recalibrate the Wi-Fi fingerprint grid based on the Wi-Fi fingerprint data collected at reference point devices 130. Reference point logic 320 may use data from active reference point devices 130 for real time data analysis and correlation.

Reference point logic 320 may predict an RF fingerprint distribution of the indoor area 110 at a current time slot. For example, reference point logic 320 may apply machine learning, density estimation, linear regression, differential equation, etc., to determine the RF fingerprint to indoor floor plan mapping. These techniques may identify the relationship between particular patterns of RF fingerprints and points within the grid of the indoor space map associated with the indoor area 110. Reference point logic 320 may analyze the RF fingerprint data collected by reference point devices 130 to determine the relationship between the RF fingerprint data and particular positions in the indoor area 110.

Wi-Fi clustering logic 330 collects data at active reference point devices 130 and uses the data to determine the clustering of the Wi-Fi access point devices 120. Wi-Fi clustering logic 330 may group Wi-Fi access point devices 120 with similar patterns into a cluster. Thus, clustering of Wi-Fi access point devices 120 reduces the likelihood of experiencing noise (i.e., it is much less likely for (every Wi-Fi access point device 120 in) the whole cluster to experience noise than a single node).

Wi-Fi clustering logic 330 may minimize the complexity associated with the Wi-Fi access point devices 120 provided that sufficient information to determine the Wi-Fi fingerprint (and location information associated with the Wi-Fi fingerprint) is received for a given point. In other words, Wi-Fi clustering logic 330 may discard (or not include in calculations) repetitive information from additional Wi-Fi access point devices 120 that may introduce additional complexity to calculations of the Wi-Fi fingerprint. Reference point devices 130 may generate a history of real-time RF fingerprints that may be used to enhance clustering for Wi-Fi access point devices 120 in the indoor area 110. Wi-Fi clustering logic 330 may use the active reference point devices 130 to collect information and select groups of Wi-Fi access point devices 120 to include in clusters, reduce noise, etc. As distance between the Wi-Fi access point devices 120 and the reference point devices 130 increases, the possibility of noise also increases. Therefore, Wi-Fi clustering logic 330 may attempt to minimize the distance between selected nodes of each cluster of Wi-Fi access point devices 120 and reference point devices 130 to reduce noise.

Figure 4:
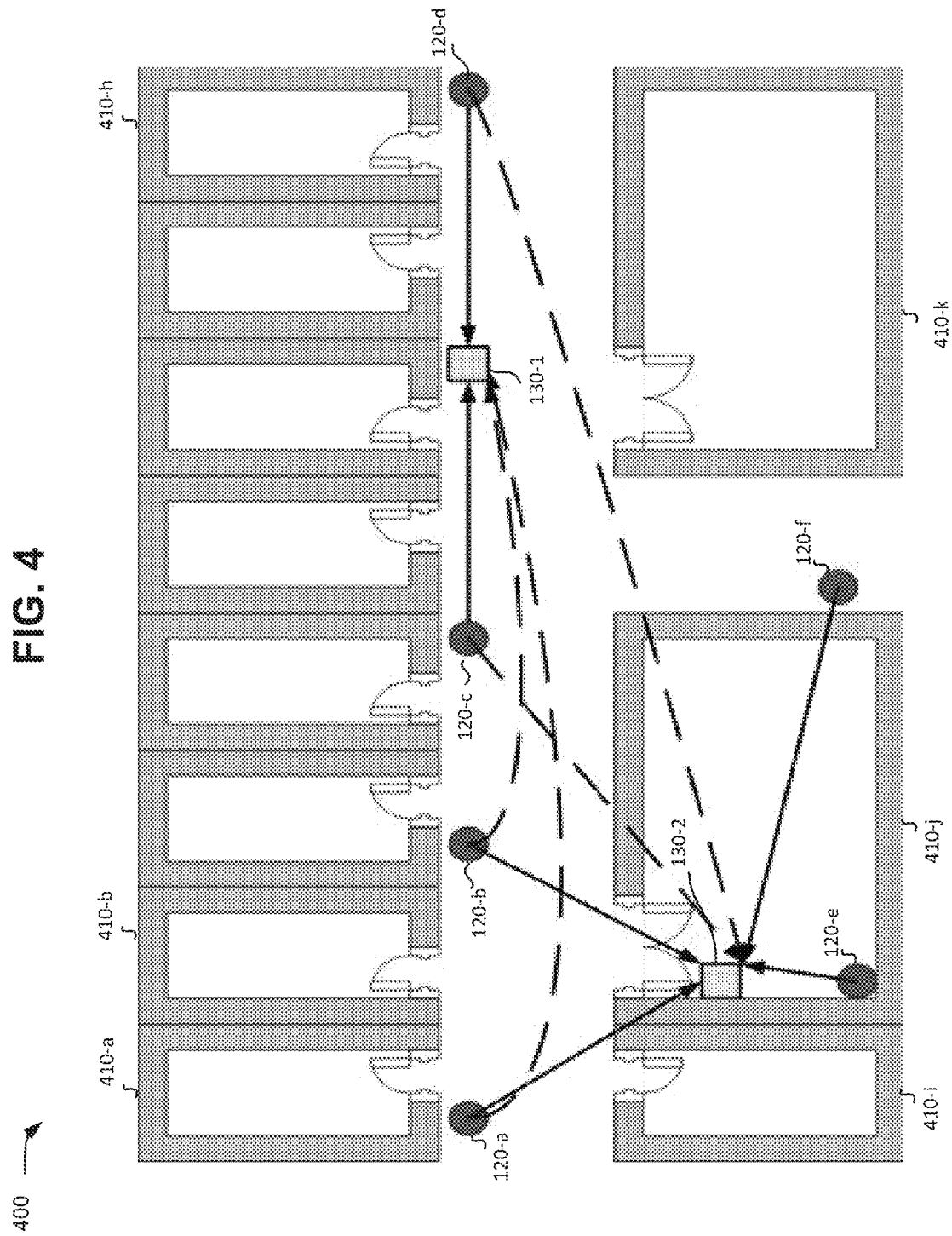
FIG. 4 is an exemplary indoor space map.

FIG. 4 is an exemplary indoor space map 400. As shown in FIG. 4, indoor space map 400 includes room sections 410-a to 410-k (collectively referred to as room sections 410 or individually as room section 410) in which (or in proximity to which) Wi-Fi access point devices 120-a to 120-f and reference point devices 130-1 and 130-2 are arranged.

Indoor location tracking server 160 may determine a selection of Wi-Fi access point devices 120 to include in each Wi-Fi (or RF) fingerprint based on the arrangement of the Wi-Fi access points with respect to the reference point devices 130. As shown in FIG. 4, indoor location tracking server 160 may determine a selection of Wi-Fi access point devices 120 based on factors such as a distance between Wi-Fi access point devices 120 and reference point devices 130, obstructions between the Wi-Fi access point devices 120 and the reference point devices 130, whether the path is direct or indirect, etc. Indoor location tracking server 160 may select Wi-Fi access point devices 120 based on these factors to reduce the chance of noise and optimize the information content collected from the Wi-Fi fingerprints. The optimized information content may include a particular confidence level (i.e., the data is not "muddy" or at a low confidence (or accuracy) level).

Indoor location tracking server 160 may determine (or receive notification of a determination) that for Wi-Fi fingerprint information collected at reference point device 130-1 (on the left side of FIG. 4) the path Wi-Fi signals travel to reference point device 130-1 from Wi-Fi access point devices 120-*a*, 120-*b* and 120-*c* would approximately be the same and have Wi-Fi fingerprint similar patterns. Indoor location tracking server 160 may eliminate data collected from Wi-Fi access point devices 120-*a* and 120-*b* (illustrated in FIG. 4 as a broken line) because this may confuse the pattern match and the informational content is not required. Wi-Fi access point devices 120-*a*, 120-*b* and 120-*c* are all correlated in informational content based on the same sight line to reference point device 130-1. Indoor location tracking server 160 may group Wi-Fi access point devices 120-*a*, 120-*b* and 120-*c* into a cluster and choose the strongest signal (e.g., from Wi-Fi access point device 120-*c*) because Wi-Fi access point devices 120-*a*, 120-*b* and 120-*c* give the same information.

Similarly, indoor location tracking server 160 may determine that reference point device 130-2 may eliminate information associated with Wi-Fi access point devices 120-*c* and 120-*d* because Wi-Fi access point devices 120-*c* and 120-*d* share a same approximate route with other Wi-Fi access point devices 120 and should be similar in Wi-Fi fingerprint patterns. For reference point device 130-2, indoor location tracking server 160 may limit, reduce or screen the Wi-Fi fingerprint data to Wi-Fi access point devices 120-*c* and 120-*d* (i.e., only looking to Wi-Fi access point devices 120 directly above reference point device 130-2 and Wi-Fi access point device 120-*f* (based on the close proximity of Wi-Fi access point device 120-*f*). Indoor location tracking server 160 may exclude far upper right Wi-Fi access point devices 120 (Wi-Fi access point device 120-*d*) because of distance (more chance for noise and more unstable) and exclude Wi-Fi access point devices 120-*c* because of construction obstacles. Indoor location tracking server 160 may also incorporate the effect of obstructions in the determination of Wi-Fi access point devices 120 to include in the calculation of the Wi-Fi fingerprint (e.g., based on RSSI). Indoor location tracking server 160 may pattern match based on the access point that provides most value in terms of pattern match.

Indoor location tracking server 160 may apply data analysis from the perspective of other reference point devices 130 to determine which Wi-Fi access point devices 120 (i.e., information associated with particular Wi-Fi access point devices 120) to include in the determination of a Wi-Fi fingerprint at a particular position in a Wi-Fi fingerprint grid matched to the floor plan of indoor area 100. In some instances, indoor location tracking server 160 may apply an iterative process or trial and error to find an accurate position of mobile device.

Figure 5:
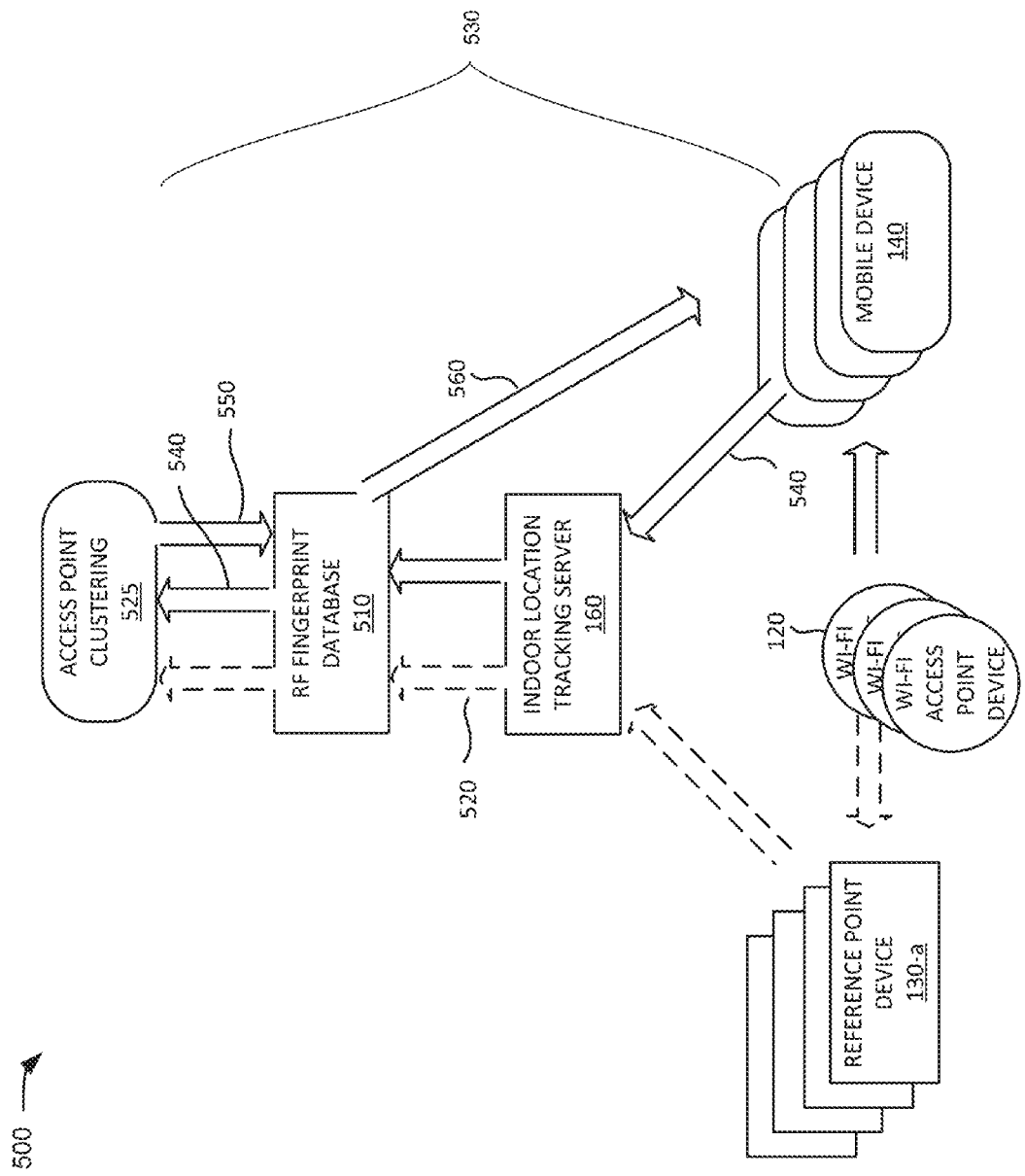
FIG. 5 illustrates an exemplary indoor location tracking workflow.

FIG. 5 is an exemplary indoor location tracking workflow 500. As shown in FIG. 5, indoor location tracking workflow 500 may include information from Wi-Fi access point devices 120, reference point devices 130, mobile devices 140, and indoor location tracing server 160. Indoor location tracking workflow 500 may include processes that may be executed by indoor location tracking server 160 including an RF fingerprint database 510, real time updating process 520, and a real time location tracking process 530.

FIG. 5 illustrates the workflow of the indoor location tracking system to determine an RF fingerprint mapping to the floor plan in indoor area 110 and a match of RF fingerprints detected by the mobile device 140 to a position in the floor plan. Indoor location tracking workflow 500 may be divided into two sub-flows, the real-time updating of the RF fingerprint database 510 (represented by a dashed arrow in FIG. 5) and the real-time location tracking process 530 of mobile device 140 (represented by a solid arrow in FIG. 5). Wi-Fi access point devices 120 may provide RF or Wi-Fi signals to both mobile devices 140 and reference point devices 130.

For real-time updating of RF fingerprint database 510, reference point devices 130 may collect RF fingerprints and send them to RF fingerprint database 510 (e.g., via indoor location tracking server 160). Active reference point devices 130 may also send a real time data stream to indoor location tracking server 160. Reference point devices 130 are infrastructure that are associated with particular positions in indoor area 110. Indoor location tracking server 160 may update RF fingerprint database 510 and perform access point clustering 525 to group the Wi-Fi access point devices 120. Indoor location tracking server 160 may determine RF fingerprints based on a minimum sufficient information in order to determine the position of a particular mobile device 140 (e.g., indoor location tracking server 160 may identify a node of a Wi-Fi access point device 120 cluster that will be used to determine the position of the particular mobile device 140). Indoor location tracking server 160 may perform Wi-Fi access point clustering 525 and discard information from additional Wi-Fi access point device 120 that may "muddy" or obscure the data.

For real-time location tracking 530, mobile device 140 may submit a request (or query) 540 for locating itself by sending an RF fingerprint, including the relative strengths of signals from Wi-Fi access point devices 120 sampled at the mobile device 140 to indoor location tracking server 160. Indoor location tracking server 160 may search RF fingerprint database 510 for a corresponding Wi-Fi fingerprint location mapping and may return (550) the best matched location back to the mobile device 140.

Figure 6:
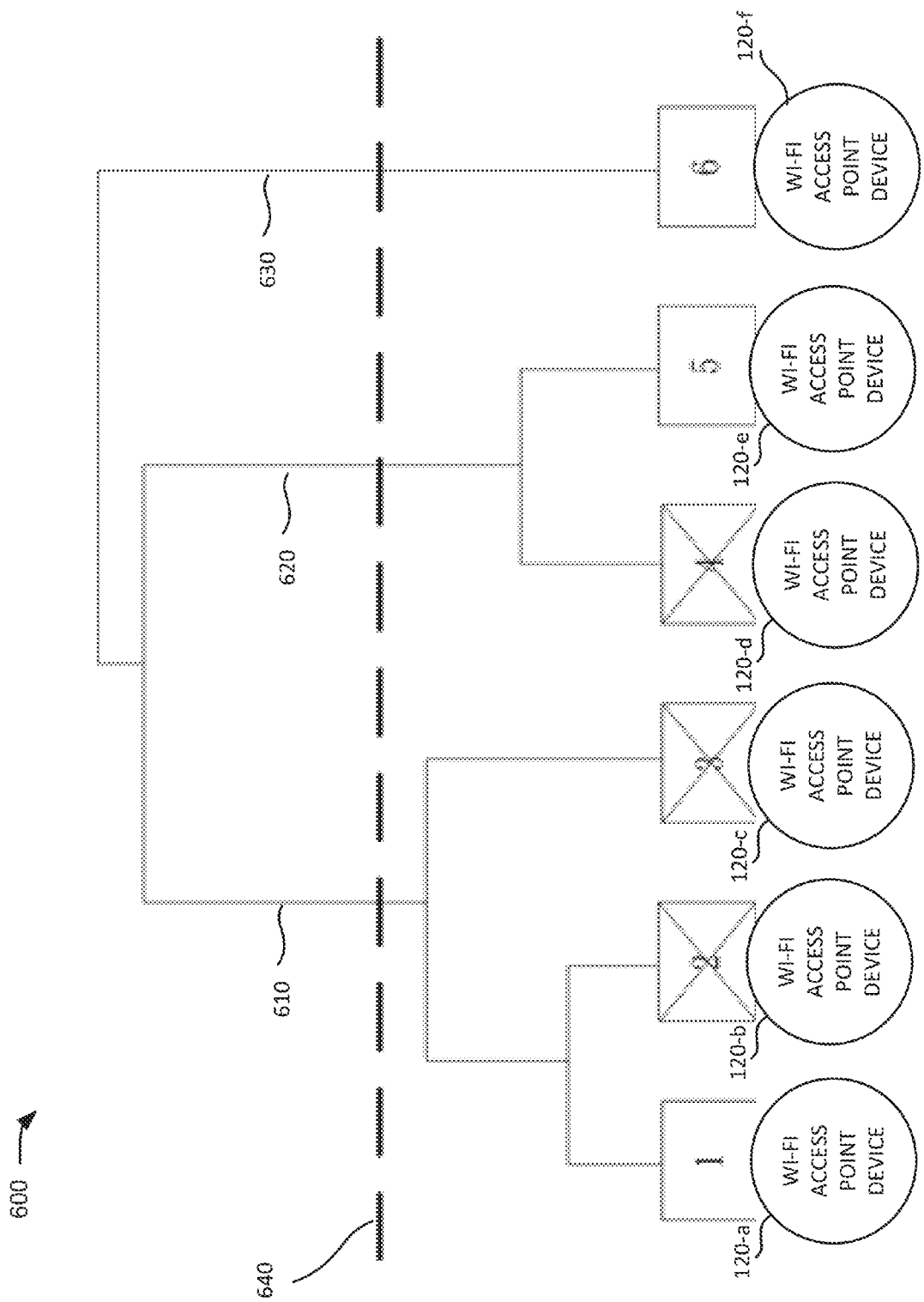
FIG. 6 illustrates an exemplary wireless access point cluster.

FIG. 6 is an exemplary cluster elimination tree 600, which is a procedure for determining Wi-Fi access point clusters. As shown in FIG. 6, cluster elimination tree 600 may include Wi-Fi access point devices 120-*a* to 120-*f* grouped into different clusters (610, 620 and 630).

As shown in FIG. 6, there are 6 access points Wi-Fi access point devices 120-*a* to 120-*f*, which are clustered as a binary tree into clusters 610, 620 and 630 based on the correlation of RF fingerprint history (i.e., similar patterns may be detected in the RF fingerprint history for nodes in a cluster). The distance from one leaf (i.e., node or Wi-Fi access point device 120) to another is determined by the correlation of RF fingerprints. If a particular threshold distance between leaves of the binary tree is selected (shown as the horizontal dashed line 640 in the middle), the six Wi-Fi access point devices 120 may be divided into clusters of Wi-Fi access point devices 120 that are within the threshold distance of each other (in this instance three clusters). The first cluster includes leaves 1, 2 and 3 or Wi-Fi access point devices 120-*a* to 120-*c*. The second cluster includes leaves 4 and 5 or Wi-Fi access point devices 120-*d* and 120-*e*. The third cluster includes only leaf 6 or Wi-Fi access point device 120-*f*. Indoor location tracking server 160 may select a single Wi-Fi access point device 120 with the highest signal strength from each cluster to be used in location tracking FIG. 7 is an exemplary functional block diagram of components implemented in reference point device 130. In an exemplary implementation, all or some of the components illustrated in FIG. 7 may be stored in memory 230. For example, referring to FIG. 7, memory 230 may include Wi-Fi fingerprint logic 710 and Wi-Fi forwarding logic 720. In addition, various logic components illustrated in FIG. 7 may be implemented by processing logic 220 executing one or more programs stored in memory 230.

Reference point devices 130 may each provide a fixed location device that may be used to determine a location of Wi-Fi access point devices 120 independent of an initial Wi-Fi fingerprint scan for the indoor area 110. Reference point device 130 may be associated with a particular position within indoor area 110.

Wi-Fi fingerprint logic 710 may sample a Wi-Fi fingerprint associated with a particular position in indoor area 110. Wi-Fi fingerprint logic 710 may adapt to changes in movement of Wi-Fi access point devices 120 without scanning based on sampled Wi-Fi fingerprints. Wi-Fi fingerprint logic 710 may consistently detect and record the Wi-Fi fingerprints.

Wi-Fi forwarding logic 720 may forward the real-time fingerprints to indoor location tracking server 160. Wi-Fi forwarding logic 720 may continuously forward the Wi-Fi fingerprints or forward based on detected changes in the Wi-Fi fingerprints.

Reference point devices 130 may be deployed in different densities based on the requirements of particular location applications associated with mobile devices 140. For example, if the requirement of accuracy of a particular location application is high, the administrators may deploy one reference point device 130 per square meter. On the other hand, if the requirement of accuracy is low, administrators may deploy one reference point device 130 per 100 square meter, etc. Thus the cost of the reference point devices 130 may be balanced against the required accuracy of particular location applications.

Figure 8:
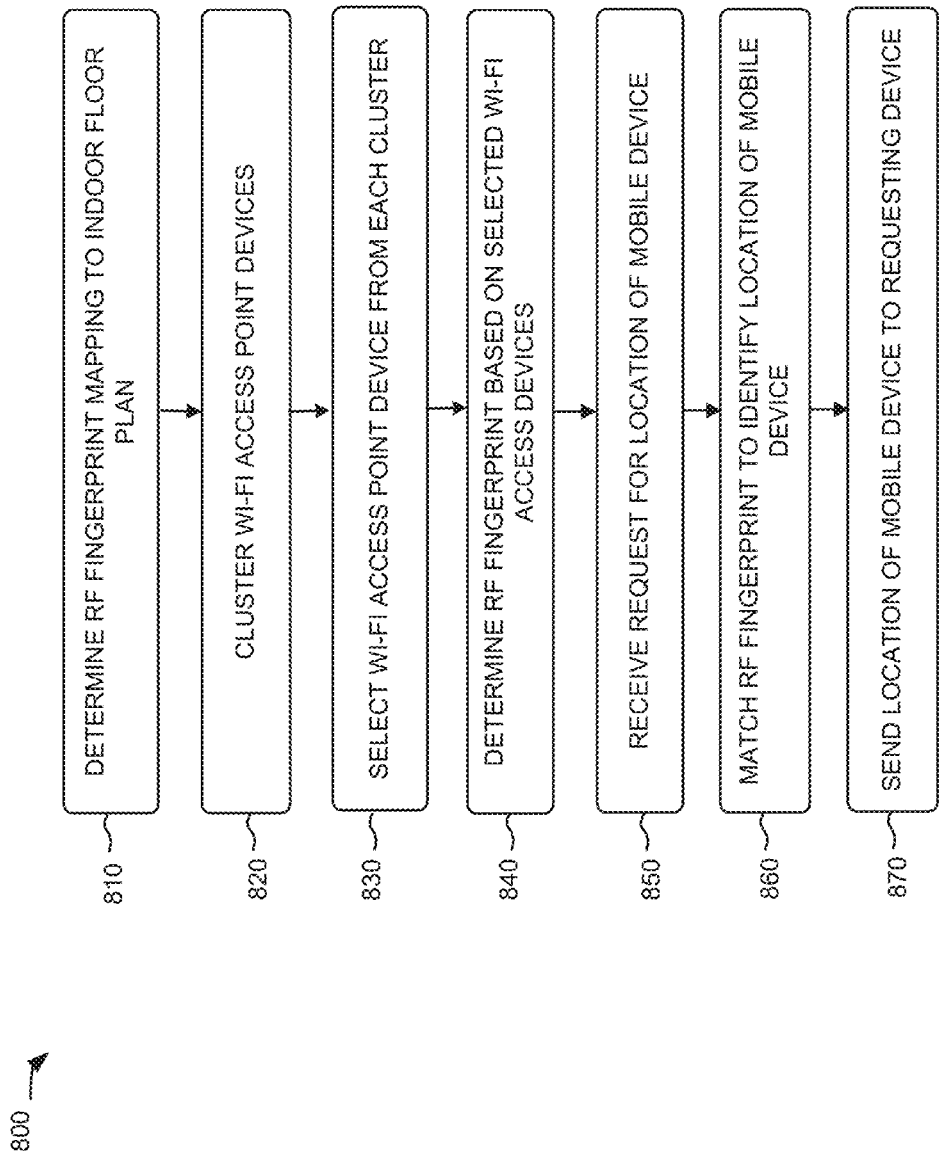
FIG. 8 is a flow diagram of an exemplary process for determining the location of a mobile device in an indoor area according to an implementation described herein.

FIG. 8 is a flow diagram illustrating exemplary processing 800 associated with the above-described features of FIGS. 1-7. More particularly, FIG. 8 illustrates an exemplary process for determining the location of a mobile device in an indoor area according to implementations described herein. In one implementation, process 800 may be performed by indoor location tracking server 160. In another implementation, some or all of process 800 may be performed by another device or group of devices, including or excluding indoor location tracking server 160.

Processing 800 may begin, at block 810, with indoor location tracking server 160 determining an RF fingerprint mapping to an indoor floor plan. For example, indoor location tracking server 160 may determine and store the relationship between physical location and RF fingerprints. Indoor location tracking server 160 may generate a database by initial scanning or based on information provided by reference point devices 130.

At block 820, indoor location tracking server 160 may perform clustering of Wi-Fi access point devices 120. For example, indoor location tracking server 160 may group Wi-Fi access point devices 120 based on similar patterns into a same cluster, such as described with respect to FIG. 6 above. Additionally, indoor location tracking server 160 may group Wi-Fi access point devices 120 based on a physical alignment of the Wi-Fi access point devices 120. Indoor location tracking server 160 may also cluster the Wi-Fi access point devices 120 based on a threshold for similarity of RF fingerprints defected at the Wi-Fi access point devices 120.

Indoor location tracking server 160 may select Wi-Fi access point devices 120 from each cluster (block 830). For example, indoor location tracking server 160 may select the Wi-Fi access point devices 120 based on highest signal strength.

At block 840, indoor location tracking server 160 may determine an RF fingerprint associated with a particular position in the floor plan based on (a Wi-Fi fingerprint detected at) the selected Wi-Fi access point devices 120. Indoor location tracking server 160 may receive updated information regarding the RF fingerprints from the reference point devices 130. For example, reference point devices 130 may collect RF fingerprint data and compare to stored RF fingerprint data to determine whether there is a change in the RF fingerprint data. Reference point devices 130 may send changed RF fingerprint data to indoor location tracking server 160.

Indoor location tracking server 160 may receive a request for a location of a mobile device 140 (block 850). For example, indoor location tracking server 160 may receive a request from mobile device 140 within the indoor location. The request may include a sampled RF fingerprint associated with a current location of the mobile device 140.

Indoor location tracking server 160 may compare the received sampled RF fingerprint data to the RF fingerprint indoor area mapping to determine a location of mobile device 140 (block 860). For example, indoor location tracking server 160 may compare signal strength and identify of wireless networks associated with each Wi-Fi fingerprint to determine whether there is a substantial match.

Indoor location tracking server 160 may send the location of mobile device 140 to the requesting device (e.g., mobile device 140) (block 870). Indoor location tracking server 160 may update the location of mobile device 140 based on changes in the RF fingerprint data.

Embodiments described may provide an indoor location tracking system based on Wi-Fi fingerprint clustering and active reference points. The system may utilize Wi-Fi fingerprint clustering to reduce noise and improve accuracy. Additionally, the system may also use information from active reference points to improve the accuracy and reduce implementation effort The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method, comprising:
    determining a radio frequency (RF) fingerprint mapping to an indoor floor plan for an indoor area;
    clustering Wi-Fi access point devices deployed in the indoor area into groups of Wi-Fi access point devices based on RF fingerprint data received by at least one reference point device;
    selecting a Wi-Fi access point device from each group of Wi-Fi access point devices;
    determining a RF fingerprint for each of the selected Wi-Fi access point devices;
    receiving a request for a location associated with a mobile device, wherein the request includes a sampled RF fingerprint associated with the mobile device; and
    comparing the RF fingerprint for each of the selected Wi-Fi access point devices with the sampled RF fingerprint associated with the mobile device to determine the location of the mobile device within the indoor area.

2. The method of claim 1, wherein determining the RF fingerprint further comprises:
    determining the RF fingerprint based on real time signals received by the at least one reference point device.

3. The method of claim 1, wherein a plurality of reference point devices are deployed based on an accuracy requirement of a location application associated with the mobile device.

4. The method of claim 1, further comprising:
    updating the RF fingerprint mapping based on information received at the at least one reference point device.

5. The method of claim 1, wherein the at least one reference point device is fixed to a particular location in the indoor floor plan.

6. The method of claim 1, further comprising:
    determining the RF fingerprint mapping based on one of machine learning, density estimation, linear regression, or differential equation.

7. The method of claim 1, wherein clustering Wi-Fi access point devices further comprises:
    clustering the Wi-Fi access point devices based on a similar RF pattern detected at the Wi-Fi access point devices.

8. The method of claim 1, wherein clustering Wi-Fi access point devices further comprises:
    clustering the Wi-Fi access point devices based on a similar sight line between the Wi-Fi access point devices and the at least one reference point device.

9. The method of claim 1, wherein clustering Wi-Fi access point devices further comprises:
    clustering the Wi-Fi access point devices based on a threshold for similarity of RF fingerprints detected at the Wi-Fi access point devices.

10. The method of claim 1, wherein selecting the Wi-Fi access point device from each group of Wi-Fi access point devices further comprises:
    selecting the Wi-Fi access point device based on a highest signal strength.

11. The method of claim 1, wherein selecting the Wi-Fi access point device from each group of Wi-Fi access point devices further comprises:
    selecting the Wi-Fi access point device based on an obstruction associated with the indoor floor plan.

12. A network device comprising:
    a memory to store a plurality of instructions; and
    a processor configured to execute the instructions in the memory to:
    determine a radio frequency (RF) fingerprint mapping to an indoor floor plan for an indoor area;
    cluster Wi-Fi access point devices deployed in the indoor area into groups of Wi-Fi access point devices based on RF fingerprint data received by at least one reference point device;
    select a Wi-Fi access point device from each group of Wi-Fi access point devices;
    determine a RF fingerprint for each of the selected Wi-Fi access point devices;
    receive a request for a location associated with a mobile device, wherein the request includes a sampled RF fingerprint associated with the mobile device; and
    compare the RF fingerprint for each of the selected Wi-Fi access point devices with the sampled RF fingerprint associated with the mobile device to determine the location of the mobile device within the indoor area.

13. The network device of claim 12, wherein, when determining the RF fingerprint, the processor is further to:
    determine the RF fingerprint based on real time signals received by the at least one reference point device.

14. The network device of claim 12, wherein a plurality of reference point devices are deployed based on an accuracy requirement of a location application associated with the mobile device.

15. The network device of claim 12, wherein the processor is further to:
    update the RF fingerprint mapping based on information received at the at least one reference point device.

16. The network device of claim 12, wherein the at least one reference point device is fixed to a location in the indoor floor plan.

17. The network device of claim 12, wherein the processor is further to:
    determine the RF fingerprint mapping based on one of machine learning, density estimation, linear regression, or differential equation.

18. The network device of claim 12, wherein, when clustering the Wi-Fi access point devices, the processor is further to:
    cluster the Wi-Fi access point devices based on a similar RF pattern detected at the Wi-Fi access point devices.

19. A non-transitory computer-readable medium including instructions to be executed by a processor in a user device, the instructions including one or more instructions, when executed by the processor, for causing the processor to:
- determine a radio frequency (RF) fingerprint mapping to an indoor floor plan for an indoor area;
- cluster Wi-Fi access point devices deployed in the indoor area into groups of Wi-Fi access point devices based on RF fingerprint data received by at least one reference point device;
- select a Wi-Fi access point device from each group of Wi-Fi access point devices;
- determine a RF fingerprint for each of the selected Wi-Fi access point devices;
- receive a request for a location associated with a mobile device, wherein the request includes a sampled RF fingerprint associated with the mobile device; and
- compare the RF fingerprint for each of the selected Wi-Fi access point devices with the sampled RF fingerprint associated with the mobile device to determine the location of the mobile device within the indoor area.

20. The non-transitory computer-readable medium of claim 19, wherein the processor is configured to:
- update the RF fingerprint mapping based on information received at the at least one reference point device.

* * * * *